(12) United States Patent
Place et al.

(10) Patent No.: US 6,964,695 B2
(45) Date of Patent: Nov. 15, 2005

(54) METHOD AND EQUIPMENT FOR REMOVING VOLATILE COMPOUNDS FROM AIR

(75) Inventors: Roger Nicholas Place, Camberley (GB); Andrew John Blackburn, Winchester (GB); Stephen Robert Tennison, Addlestone (GB); Anthony Paul Rawlinson, Sunbury-on-Thames (GB); Barry David Crittenden, Bradford-on-Avon (GB)

(73) Assignee: Carbon Technologies NV, Curacao (NL)

( * ) Notice: Subject to any disclaimer, the term of this patent is extended or adjusted under 35 U.S.C. 154(b) by 0 days.

(21) Appl. No.: 10/660,221

(22) Filed: Sep. 11, 2003

(65) Prior Publication Data

US 2004/0045438 A1 Mar. 11, 2004

Related U.S. Application Data

(63) Continuation of application No. PCT/GB02/01142, filed on Mar. 13, 2003.

(30) Foreign Application Priority Data

Mar. 13, 2001 (GB) ............................................. 0106082

(51) Int. Cl.$^7$ ............................................. B01D 53/04
(52) U.S. Cl. ............................. 95/143; 95/148; 95/901; 96/130; 96/143; 96/154
(58) Field of Search ............................. 95/90, 141, 143, 95/148, 901; 96/108, 122, 130–133, 143, 154

(56) References Cited

U.S. PATENT DOCUMENTS

| | | |
|---|---|---|
| 3,608,273 A * | 9/1971 | Fabuss et al. ................. 95/148 |
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,377,396 A * | 3/1983 | Krauss et al. ................. 95/141 |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,677,086 A | 6/1987 | McCue et al. |
| 4,723,212 A | 2/1988 | Mindrum et al. |
| 4,737,164 A * | 4/1988 | Sarkkinen ..................... 95/68 |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |

(Continued)

FOREIGN PATENT DOCUMENTS

| | | |
|---|---|---|
| AU | 200039412 A1 | 12/2000 |
| BE | 1002756 A6 | 5/1991 |

(Continued)

OTHER PUBLICATIONS

"Internet based secure transactions using encrypting applets and cgi–scripts Independent of browser or server capabilities"; 1998, *IBM Research Disclosure*, No. 410116, pp. 800–801.

*Primary Examiner*—Robert H. Spitzer
(74) *Attorney, Agent, or Firm*—Baker Botts LLP

(57) ABSTRACT

A regenerable adsorber for removing VOCs from gas streams consists of a porous monolithic carbon which can be regenerated by heating by passing an electric current through it.

16 Claims, 10 Drawing Sheets

U.S. PATENT DOCUMENTS

| | | |
|---|---|---|
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,110,328 A * | 5/1992 | Yokota et al. ................ 96/112 |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,308,457 A | 5/1994 | Dalla Betta et al. |
| 5,308,703 A * | 5/1994 | Tsujimoto et al. .......... 428/408 |
| 5,353,218 A | 10/1994 | De Lapa et al. |
| 5,376,609 A * | 12/1994 | Guile ........................ 502/62 |
| 5,380,991 A | 1/1995 | Valencia et al. |
| 5,389,325 A | 2/1995 | Bookbinder et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,482,538 A * | 1/1996 | Becker et al. .................. 95/12 |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,505,825 A * | 4/1996 | Gold et al. .................... 95/126 |
| 5,509,956 A * | 4/1996 | Opperman et al. ............ 95/109 |
| 5,510,063 A * | 4/1996 | Gadkaree et al. .......... 264/29.7 |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,542,965 A * | 8/1996 | Straubinger et al. ........... 95/14 |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,628,819 A * | 5/1997 | Mestemaker et al. ......... 96/122 |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,658,372 A * | 8/1997 | Gadkaree ..................... 95/116 |
| 5,687,322 A | 11/1997 | Deaton et al. |
| 5,689,100 A | 11/1997 | Carrithers et al. |
| 5,727,153 A | 3/1998 | Powell |
| 5,734,838 A | 3/1998 | Robinson et al. |
| 5,742,845 A | 4/1998 | Wagner |
| 5,750,026 A | 5/1998 | Gadkaree et al. |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,827,355 A | 10/1998 | Wilson et al. |
| 5,832,457 A | 11/1998 | O'Brien et al. |
| 5,844,218 A | 12/1998 | Kawan et al. |
| 5,845,259 A | 12/1998 | West et al. |
| 5,851,403 A * | 12/1998 | Petrisko et al. ............. 210/670 |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,908,490 A * | 6/1999 | Akamatsu et al. ............ 95/113 |
| 5,909,486 A | 6/1999 | Walker et al. |
| 5,912,453 A | 6/1999 | Gungl et al. |
| 5,914,294 A | 6/1999 | Park et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |

| Patent No. | Date | Name | Ref |
|---|---|---|---|
| 5,970,469 A | 10/1999 | Scroggie et al. | |
| 5,972,077 A * | 10/1999 | Judkins et al. | 95/136 |
| 5,974,399 A | 10/1999 | Giuliani et al. | |
| 5,974,549 A | 10/1999 | Golan | |
| 5,978,013 A | 11/1999 | Jones et al. | |
| 5,987,795 A | 11/1999 | Wilson | |
| 5,997,042 A | 12/1999 | Blank | |
| 6,000,608 A | 12/1999 | Dorf | |
| 6,002,771 A | 12/1999 | Nielsen | |
| 6,003,113 A | 12/1999 | Hoshino | |
| 6,003,134 A | 12/1999 | Kuo et al. | |
| 6,005,942 A | 12/1999 | Chan et al. | |
| 6,009,411 A | 12/1999 | Kepecs | |
| 6,012,635 A | 1/2000 | Shimada et al. | |
| 6,014,634 A | 1/2000 | Scroggie et al. | |
| 6,024,286 A | 2/2000 | Bradley et al. | |
| 6,038,551 A | 3/2000 | Barlow et al. | |
| 6,041,309 A | 3/2000 | Laor | |
| 6,047,325 A | 4/2000 | Jain et al. | |
| 6,049,778 A | 4/2000 | Walker et al. | |
| 6,052,468 A | 4/2000 | Hillhouse | |
| 6,052,690 A | 4/2000 | de Jong | |
| 6,052,785 A | 4/2000 | Lin et al. | |
| 6,055,509 A | 4/2000 | Powell | |
| 6,061,660 A | 5/2000 | Eggleston et al. | |
| 6,067,526 A | 5/2000 | Powell | |
| 6,070,147 A | 5/2000 | Harms et al. | |
| 6,073,238 A | 6/2000 | Drupsteen | |
| 6,076,068 A | 6/2000 | DeLapa et al. | |
| 6,076,069 A | 6/2000 | Laor | |
| 6,089,611 A | 7/2000 | Blank | |
| 6,094,656 A | 7/2000 | De Jong | |
| 6,097,011 A | 8/2000 | Gadkaree et al. | |
| 6,101,422 A | 8/2000 | Furlong | |
| 6,101,477 A | 8/2000 | Hohle et al. | |
| 6,105,002 A | 8/2000 | Powell | |
| 6,105,865 A | 8/2000 | Hardesty | |
| 6,105,873 A | 8/2000 | Jeger | |
| 6,112,987 A | 9/2000 | Lambert et al. | |
| 6,112,988 A | 9/2000 | Powell | |
| 6,119,933 A | 9/2000 | Wong et al. | |
| 6,119,945 A | 9/2000 | Muller et al. | |
| 6,122,631 A | 9/2000 | Berbec et al. | |
| 6,129,274 A | 10/2000 | Suzuki | |
| 6,144,948 A | 11/2000 | Walker et al. | |
| 6,151,586 A | 11/2000 | Brown | |
| 6,151,587 A | 11/2000 | Matthias | |
| 6,154,751 A | 11/2000 | Ault et al. | |
| 6,161,870 A | 12/2000 | Blank | |
| 6,164,549 A | 12/2000 | Richards | |
| 6,170,061 B1 | 1/2001 | Beser | |
| 6,173,269 B1 | 1/2001 | Solokl et al. | |
| 6,173,891 B1 | 1/2001 | Powell | |
| 6,179,205 B1 | 1/2001 | Sloan | |
| 6,179,710 B1 | 1/2001 | Sawyer et al. | |
| 6,183,017 B1 | 2/2001 | Najor et al. | |
| 6,185,541 B1 | 2/2001 | Scroggie et al. | |
| 6,189,100 B1 | 2/2001 | Barr et al. | |
| 6,189,787 B1 | 2/2001 | Dorf | |
| 6,195,666 B1 | 2/2001 | Schneck et al. | |
| 6,210,276 B1 | 4/2001 | Mullins | |
| 6,216,014 B1 | 4/2001 | Proust et al. | |
| 6,216,204 B1 | 4/2001 | Thiriet | |
| 6,220,510 B1 | 4/2001 | Everett et al. | |
| 6,222,914 B1 | 4/2001 | McMullin | |
| 6,230,143 B1 | 5/2001 | Simons et al. | |
| 6,237,145 B1 | 5/2001 | Narasimhan et al. | |
| 6,241,287 B1 | 6/2001 | Best et al. | |
| 6,243,687 B1 | 6/2001 | Powell | |
| 6,243,688 B1 | 6/2001 | Kalina | |
| 6,244,958 B1 | 6/2001 | Acres | |
| 6,266,647 B1 | 7/2001 | Fernandez | |
| 6,267,263 B1 | 7/2001 | Emoff et al. | |
| 6,269,158 B1 | 7/2001 | Kim | |
| 6,279,112 B1 | 8/2001 | O'Toole, Jr. et al. | |
| 6,280,504 B1 * | 8/2001 | McMahon | 95/116 |
| 6,282,516 B1 | 8/2001 | Giuliani | |
| 6,292,785 B1 | 9/2001 | McEvoy et al. | |
| 6,292,786 B1 | 9/2001 | Deaton et al. | |
| 6,296,191 B1 | 10/2001 | Hamann et al. | |
| 6,299,530 B1 | 10/2001 | Hansted et al. | |
| 6,321,208 B1 | 11/2001 | Barnett et al. | |
| 6,364,936 B1 * | 4/2002 | Rood et al. | 95/115 |
| 6,372,018 B1 * | 4/2002 | Cowles | 95/18 |
| 6,385,723 B1 | 5/2002 | Richards | |
| 6,390,374 B1 | 5/2002 | Carper et al. | |
| 6,458,186 B1 * | 10/2002 | Chmiel et al. | 95/115 |
| 6,480,935 B1 | 11/2002 | Carper et al. | |
| 6,549,773 B1 | 11/2002 | Carper et al. | |
| 6,521,019 B2 * | 2/2003 | Jain et al. | 95/96 |
| 6,549,912 B1 | 4/2003 | Chen | |
| 6,565,627 B1 * | 5/2003 | Golden et al. | 95/96 |
| 6,612,490 B1 | 9/2003 | Herrendoerfer et al. | |
| 6,681,995 B2 | 1/2004 | Sukeda et al. | |
| 6,689,345 B2 | 2/2004 | Jager Lezer | |
| 2002/0002468 A1 | 1/2002 | Spagna et al. | |
| 2002/0076051 A1 | 6/2002 | Nil | |
| 2003/0041733 A1 * | 3/2003 | Seguin et al. | 96/108 |
| 2003/0089230 A1 * | 5/2003 | Jain et al. | 95/90 |

FOREIGN PATENT DOCUMENTS

| | | |
|---|---|---|
| CA | 2293944 | 8/2000 |
| CA | 2267041 | 9/2000 |
| CA | 2317138 A1 | 1/2002 |
| DE | 4104513 | 8/1991 |
| DE | 19613326 | 10/1996 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0254551 | 1/1988 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0684071 | 11/1995 |
| EP | 0780150 | 6/1997 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2709431 | 3/1995 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |

| | | | | | | |
|---|---|---|---|---|---|---|
| GB | 2343091 A | 4/2000 | | WO | WO 00/75775 A2 | 12/2000 |
| GB | 2351379 A | 12/2000 | | WO | WO 00/77750 A1 | 12/2000 |
| GB | 2355324 A | 4/2001 | | WO | WO 01/04851 A1 | 1/2001 |
| JP | 2000-112864 A | 4/2000 | | WO | WO 01/06341 A1 | 1/2001 |
| JP | 2000-181764 A | 6/2000 | | WO | WO 01/08087 A1 | 2/2001 |
| JP | 2001-202484 A | 7/2001 | | WO | WO 01/13572 A1 | 2/2001 |
| JP | 2001-236232 A | 8/2001 | | WO | WO 01/15397 A1 | 3/2001 |
| KR | 0039297 A | 5/2001 | | WO | WO 01/18633 A1 | 3/2001 |
| KR | 0044823 A | 6/2001 | | WO | WO 01/18746 A1 | 3/2001 |
| KR | 0058742 A | 7/2001 | | WO | WO 01/29672 A1 | 4/2001 |
| KR | 0021237 A | 3/2002 | | WO | WO 01/33390 A2 | 5/2001 |
| WO | WO 90/16126 A1 | 12/1990 | | WO | WO 01/40908 A2 | 6/2001 |
| WO | WO 96/25724 A1 | 8/1996 | | WO | WO 01/42887 A2 | 6/2001 |
| WO | WO 96/38945 A1 | 12/1996 | | WO | WO 01/44900 A2 | 6/2001 |
| WO | WO 96/42109 A1 | 12/1996 | | WO | WO 01/44949 A2 | 6/2001 |
| WO | WO 97/05582 A1 | 2/1997 | | WO | WO 01/47176 A1 | 6/2001 |
| WO | WO 97/10562 A1 | 3/1997 | | WO | WO 01/50229 A2 | 7/2001 |
| WO | WO 97/39424 A1 | 10/1997 | | WO | WO 01/52575 A1 | 7/2001 |
| WO | WO 98/02834 A1 | 1/1998 | | WO | WO 01/55955 A1 | 8/2001 |
| WO | WO 98/09257 A1 | 3/1998 | | WO | WO 01/59563 A1 | 8/2001 |
| WO | WO 98/20465 A1 | 5/1998 | | WO | WO 01/61620 A1 | 8/2001 |
| WO | WO 98/43169 A2 | 10/1998 | | WO | WO 01/65545 A2 | 9/2001 |
| WO | WO 98/43212 A1 | 10/1998 | | WO | WO 01/67694 A1 | 9/2001 |
| WO | WO 98/52153 A2 | 11/1998 | | WO | WO 01/71648 A2 | 9/2001 |
| WO | WO 99/10824 A1 | 3/1999 | | WO | WO 01/71679 A2 | 9/2001 |
| WO | WO 99/16030 A1 | 4/1999 | | WO | WO 01/73530 A2 | 10/2001 |
| WO | WO 99/19846 A2 | 4/1999 | | WO | WO 01/73533 A1 | 10/2001 |
| WO | WO 99/44172 A1 | 9/1999 | | WO | WO 01/78020 A1 | 10/2001 |
| WO | WO 99/45507 A1 | 9/1999 | | WO | WO 01/80563 A1 | 10/2001 |
| WO | WO 99/49415 A2 | 9/1999 | | WO | WO 01/84377 A2 | 11/2001 |
| WO | WO 99/49426 A1 | 9/1999 | | WO | WO 01/84474 A2 | 11/2001 |
| WO | WO 00/39714 A1 | 7/2000 | | WO | WO 01/84512 A1 | 11/2001 |
| WO | WO 00/46665 A2 | 8/2000 | | WO | WO 01/88705 A1 | 11/2001 |
| WO | WO 00/54507 A1 | 9/2000 | | WO | WO 02/06948 A1 | 1/2002 |
| WO | WO 00/57315 A2 | 9/2000 | | WO | WO 02/10962 A1 | 2/2002 |
| WO | WO 00/57613 A1 | 9/2000 | | WO | WO 02/14991 A2 | 2/2002 |
| WO | WO 00/62265 A1 | 10/2000 | | WO | WO 02/15037 A1 | 2/2002 |
| WO | WO 00/62472 A1 | 10/2000 | | WO | WO 02/21315 A1 | 3/2002 |
| WO | WO 00/67185 A1 | 11/2000 | | WO | WO 02/29577 A2 | 4/2002 |
| WO | WO 00/68797 A1 | 11/2000 | | WO | WO 02/088895 A2 | 11/2002 |
| WO | WO 00/68902 A1 | 11/2000 | | | | |
| WO | WO 00/68903 A1 | 11/2000 | | | | |
| WO | WO 00/69183 A2 | 11/2000 | | | | |

* cited by examiner

METHOD AND EQUIPMENT FOR REMOVING VOLATILE COMPOUNDS FROM AIR

This application is a continuation of International Application PCT/GB02/01142 filed Mar. 13, 2003, which International Application was published in English by the International Bureau on Sep. 19, 2002, which claims the priority of Great Britain Application No. 0106082.1, filed Mar. 13, 2001.

The present invention relates to a method and apparatus for removing and recovering volatile emission such as volatile organic compound (VOC) emissions.

The control of volatile organic compound (VOC) emissions in factories and other work places is a critical aspect of the overall reduction in organic emissions mandated as part of the Kyoto protocol. A significant part of the total VOC emissions in Europe come from general industrial processes such as printing, surface treatments etc and large part of these emissions can be attributed to small industrial sites where the cost of treating the contaminated air is prohibitive.

At present the only routes available are adsorption or thermal or catalytic oxidation. The oxidation processes have lower initial capital costs but when used to treat typical low level organic streams (<5000 ppm) have very high operating costs due to the requirement to feed large amounts of natural gas to bring the air stream up to combustion concentrations. Nonetheless these are often the favoured solution due to their simplicity.

The alternative systems are adsorption based and usually use active carbon as the adsorbent. Two types of systems are currently available:

Non regenerable. In these systems the adsorbent bed comprises a simple "cartridge" type system that is removed and replaced when saturated. The company supplying the system maintains responsibility for the removal and replacement of the carbon. These systems have a low capital cost and the operating costs simply reflect the regular removal and replacement of the carbon although further constraints in terms of the transportation of hazardous wastes may become significant. These systems are restricted to small gas flows and/or low organics levels to restrict the frequency and the volume of the carbon replacement.

Regenerable. In these systems the carbon is regenerated in situ. Two types of system exist for continuous operation—multiple fixed bed and moving bed units. In the multiple bed units one or more beds are adsorbing whilst one bed is being regenerated and a further bed could be cooling back from the regeneration temperature. Regeneration is usually by steam although hot inert gas is sometimes used. In the case of steam regeneration further processing of the condensate containing the VOC is often required and this can be quite complex and expensive for organics with high water solubilities. Hot gas regeneration has a much lower thermal efficiency and the cost of the process can become dominated by the amount of hot gas required to bring the beds up to the regeneration temperature as steam has a higher thermal efficiency and the majority of the heat to initially raise the bed temperature comes from the heat of condensation of the steam. In the rotating bed (or "wheel") systems the carbon is contained in a single rotating bed where a sector of the bed passes in front of the inlet VOC contaminated gas stream whilst another sector passes in Front of a hot regenerating gas. In this system the regenerating gas is usually nitrogen and the overall system is frequently used as a concentrator in front of a thermal oxidation system to avoid the use of combustion gas.

Both of the regenerable carbon systems are complex with the requirement for further effluent processing. The complexity tends to make these systems very expensive for small gas flows. A further design limitation is the requirement to heat the regeneration gas to a higher temperature than the regeneration temperature as this is the only source of energy to bring the carbon bed to the desired temperature. This places minimum flow limitations on the regeneration gases which then impacts on the concentration of the VOC's removed from the bed during regeneration. This minimum flow limit may then impose a requirement for low temperature refrigeration of the effluent gas to achieve the desired VOC recovery. The gas flow requirement for the bed to reach regeneration temperature also imposes limitations on the cycle time—that is the combined time required for the bed to become saturated and then for full regeneration. Ideally the adsorption and regeneration cycle times should be equivalent when the process can be limited to a two bed system. If regeneration takes longer than adsorption then it will be necessary to use multiple bed systems.

U.S. Pat. No. 5,827,355 discloses the use of a compacted activated carbon fibre bed. As shown in the patent this requires the formation of quite complex shaped adsorbent mats with small bed depths and its use is only claimed for air conditioning units rather than the higher industrial gas flows (1000 m$^3$/hour).

In both cases (regenerable and non regenerable) a further limitation is imposed by the use of granular activated carbon as the adsorbent. Beds with a significant length to diameter ratio tend to have quite high pressure drops which may then necessitate the use of compressors to achieve the desired feed flow through the beds.

Surprisingly we have now found that monolithic adsorbers can give equivalent breakthrough characteristics to packed granular beds but without the disadvantages of high pressure drops.

We have now devised apparatus and a method for removing VOCs from air which utilises a monolithic carbon adsorber which can be regenerated by electrical heating and which reduces these problems.

According to the invention there is provided a method for removing volatile compounds from air which method comprises passing the air over an adsorber comprising a monolithic porous carbon to adsorb the volatile compounds and then passing an electric current through the adsorber to heat the adsorber and drive off at least some of the adsorbed compounds The invention also provides apparatus for the regenerable adsorption of VOCs which apparatus comprises an adsorber bed which comprises a porous carbon monolith, a gas inlet and a gas outlet for the adsorber bed whereby gas or vapour can be passed over the adsorber bed and a means for passing an electric current through the adsorber bed.

The monoliths preferably have a resistivity of between 0.1 and 50 ohms/m which allows effective electrical heating without excessively high currents or voltages The monoliths can be further modified to provide lower resistance ends to allow effective connection of the power cables and also to reduce the temperature of the monolith in the vicinity of the seals The monoliths can be produced with a surface area of at least 700 m$^2$/g, preferably in excess of 1000 m$^2$/g to give the required adsorption capacity The problems associated with previous systems are overcome through the use of direct electrically heated monolithic VOC control systems as in the present invention.

The monoliths can be produced in minimum lengths of around 60 cm and they can also be joined to produce longer lengths without compromising the electrical conductivity. The monoliths useful in the present invention exhibit adsorption kinetics consistent with their use in the adsorption system. This enables long adsorber beds to be used.

In general the longer the total length of the bed the better the adsorbant properties and the requirement for additional length can also be achieved by using a three bed system where two monoliths adsorb and one regenerates. This has the benefit of reducing the number of monoliths required (adsorption efficiency increased), reducing the number of monoliths that have to be regenerated at any point in the cycle and reducing the length of the reactors. As in the two bed, long monolith, system the integrated regeneration is only possible because of the low regenerant gas flows and the use of electrical heating.

The way in which the monoliths are electrically connected is important as, if in systems where there are a plurality of monoliths, all of the monoliths are in parallel as far as the gas flow is concerned, the simplest way of electrically connecting the monoliths would then be to operate them in series as well. However, if the reactor contains a significant number of monoliths, all connected in parallel, this will lead to a very low overall resistance and the requirement for a very high current, low voltage, power system. The use of all of the monoliths in parallel can also lead to problems with current maldistribution. If the resistance of the monoliths varies the total power carried by the lower resistance monoliths will be higher. These will then heat more quickly further lowering the resistance, due to the negative temperature coefficient of resistance of carbon, and potentially leading to thermal runaway. However if some of the monoliths are connected in series the power is controlled by the higher resistance monoliths and, as the greater voltage drop will be across the higher resistance monoliths, these will potentially heat more quickly bringing their resistance down towards that of the lower resistance monoliths.

Preferably a plurality of monoliths can be electrically connected together in series or in parallel to obtain an adsorber bed with the desired capacity and electrical properties. The gas flow through the monoliths will normally be in series. This enables the gas flow through the structure to be adjusted independently of the electrical characteristics of the bed. However we have found that the frequently observed "poor" performance of monolith adsorbers can often be associated with a characteristic of the monolithic reactors we have termed "leakage". This is a low level of VOC's that exits the bed almost immediately the feed is introduced and well before the normal breakthrough We have also surprisingly shown that the leakage can be reduced by using multiple shorter lengths of monolith and further reduced if the multiple short lengths of monolith are separated by small spaces but where the overall monolith length in both cases remains unaltered.

The shorter lengths of monoliths can be positioned so that the pore structures are not aligned e.g. if a longer monolith is divided into two or more shorter lengths the adjacent lengths are rotated relative to each other.

In one embodiment of the invention the monolith bed is formed of a plurality of shorter monoliths joined together with a gap or space between the individual monoliths. In order to form such structures made up of monoliths in series the monoliths need to be connected electrically and with a gas tight conduit.

For the regeneration of the monoliths an electric current is passed through the monoliths and electrical connections can be made directly to the carbon monoliths using simple clamp systems. However contact resistance effects can lead to severe overheating which loosens the clamps leading to still further localised heating. This can also cause degradation of any elastomeric seals. it is preferred to decrease the resistance of the ends of the monoliths so that these remain cool with respect to the remainder of the monoliths limiting problems with the clamps and the seals.

One way of accomplishing this is to connect the ends of the monoliths with a metal connector such as a metal mesh and to surround the ends of both monoliths with a gas impervious plastic, it is convenient to use a shrink wrap plastics tube made of a material at the temperature for regeneration of the bed. Such material is widely available and a suitable material is sold under the Trade name "Flame Retardant Heat Shrink—RP4800" sold by Raychem. In the case of the monolith end connection the electrical connection can either be directly soldered to the metal mesh or can be a further mesh connection under the existing mesh wrap. This system, using shrink wrap and mesh wrap, can be readily applied to the construction of reactor systems containing large numbers of monoliths.

The electrical connection between the monoliths and the mesh wrap can be further enhanced by copper plating the ends of the carbon monoliths although this will probably only be necessary for high current applications. Well known methods for copper electroplating metals can be used without further modification for electroplating the carbon monoliths. For example copper plating was achieved by immersing the ends of the activated carbon monoliths in a solution containing 250 g of copper sulphate, 50 g of concentrated sulphuric acid and 10 g of phenol in 1 Liter of water. For plating a single monolith typical conditions were 2.5V and 2000 to 2500 ma. Under these conditions a good copper coating could be achieved in between 30 and 60 minutes.

Disclosed methods for the production of monolithic carbon structures are generally restricted to either polymer bound carbon structures (U.S. Pat. No. 5,389,325), ceramic bound carbon systems (U.S. Pat. No. 4,677,086, U.S. Pat. No. 5,914,294) or carbon coated ceramic structures. In all of these cases the presence of the polymer or the ceramic will prelude the use of electrical regeneration.

We have now found that controlled structure monoliths can be produced by the extrusion and sintering of phenolic resin powders produced by the controlled cure of novolak resins. The production of shaped porous phenolic resin artifacts has been described but this was limited to relatively simple forms such as blocks, pellets and spaghetti type extrudates. Surprisingly we have now found that despite the large weight losses (>50%) and volume shrinkages (50% volume) it is possible to produce large and complex monolithic forms with fine cell structures on a near net shape basis provided that dough formulation is correctly specified. In the process of this invention the volume shrinkage actually offers benefits as it leads to the production of a smaller cell size and wall thickness than was present in the original extruded form.

The monolithic porous carbon useful in the present invention can be made by partially curing a phenolic resin to a solid, comminuting the partially cured resin, sintering the comminuted resin so as to produce a form-stable sintered product and carbonising the form-stable sintered product.

By "porous" is meant that the carbon has continuous voids or pores through which liquid or vapours can pass.

By monolithic is meant that the porous carbon is in a single piece i.e. not granular or not composed of granular carbons bound together by a binder etc. The monolithic carbon preferably contains large transport channels through which the gas can flow and by which means the pressure drop can be controlled.

The sintering is thought to cause the individual particles of the resin to adhere together, without the need of a binder, while retaining their individual identity to a substantial extent on heating to carbonisation temperatures, The particles should not melt to form a mass as this would result in loss of pore structure.

The duration and temperature of the partial curing step and the amount of any crosslinking agent which is optionally added should be controlled so as to produce a comminuted sintered product of the required properties such as pore size, porosity, permeability.

Preferably the comminuted resin particles have a particle size of 100 to 250 micrometers. The carbonisation steps take place preferably by heating above 600° C. for the requisite time e.g. 1 to 48 hours and takes place under an inert atmosphere or vacuum to prevent oxidation of the carbon.

EP 0 254 551 gives details of methods of forming the porous carbons suitable for forming the porous carbon and its contents are included herein by reference.

Phenolic resins are well known materials. They are made by the reaction of a phenol and an aldehyde, e.g. formaldehyde. The condensation is initially carried out to produce a partially condensed product. The condensation may be carried out so as to produce a resin which is fully curable on further heating. Alternatively, the condensation may be carried out so as to produce a novolak resin which is only curable when an additional cross-linking agent is mixed with it, e.g. hexamethylene tetramine (known as "hexamine" or "hex"). It is preferred to use hexamine-cured novolak resins in the process of the present invention.

After carbonisation the monolithic porous carbon can be activated to provide the necessary pore volume and surface area. Activation can take place in either steam or carbon dioxide at temperatures above approximately 750° C. or in air at temperatures of between 400 and 500° C., or in combinations of these gases. The activation process is carried out for a time that varies with the temperature and the activation gas composition, such that a carbon weight loss of between 20 and 40% is achieved.

In order to modify the properties of the carbon filter the step of partially curing the resin for comminution can be carried out in at least two stages with the addition of a pore modifying agent part way through the partial cure.

Monolithic adsorbers can be characterised by several structural parameters related to the physical form of the monolith and the inherent pore structure of the material comprising the monolith walls. The macrostructure of the monolith is defined by the cell size, C, and the wall thickness, t (see FIG. 7). The pore structure of the walls is defined by the macropore size and pore volume and the micropore size and micropore volume.

Preferably the monoliths have a cell structure (cells per square cm—cpcm) where the channel size is between 0.5 and 1 mm and the wall thickness is between 0.5 and 1 mm with an open area of between 30 and 60% to give a good carbon packing density per unit volume and acceptable mass transfer characteristics.

Theoretical studies have shown that, provided the performance of the monolith is not controlled by diffusional limitations within the wall structure of the monolith, then the optimum structure is a cell size, c, of approximately 150 microns, with a wall thickness of approximately 150 microns, equivalent. With this cell structure the monolith gives equivalent dynamic performance to a granular carbon with a particle size of 300 microns but without the problems of pressure drop and attrition etc associated with the operation of granular beds. A critical aspect of the technology is then the ability to produce pure, electrically conducting, carbon monoliths with these controlled cell structures.

The monolithic carbons are resistant to high temperatures and are biologically inert.

Preferably there is a small granular carbon bed through which the exit gases from the monolithic filter pass. Granular carbon has improved breakthrough characteristics compared with monolithic carbon but has a higher pressure drop which may then necessitate the use of compressors to achieve the desired feed flow through the beds when granular beds are used on there own.

However by only using the granular bed to remove traces of the VOCs i.e. to polish the effluent from the monolith bed the volume of granular carbon and the pressure drop introduced is minimised. The problems inherent in heating granular beds are also eliminated as the monolith bed is now used as a preheater for the granular bed.

Furthermore by positioning the granular bed at the outlet of the monolith bed and then regenerating in counter current flow mode, the granular bed sees clean regenerant gas which facilitates cleaning at minimum temperature.

The granular bed preferably comprises granular or extruded activated carbon of particle size of 0.1 mm. to 2 mm and preferably has a volume of up to 15% of the volume of the monolithic bed.

The apparatus of the invention can be used in a system which incorporates two or more beds so that when one bed is adsorbing the other bed is being regenerated so that the beds can be switched when the exit gases from the adsorbing bed reaches the legal or other limit.

It is a feature of the apparatus and method of the present invention that it eliminates the problems associated with high gas flows during regeneration as the direct heating of carbon which is necessary can be achieved with direct electrical heating. Hot spots are not developed in the bed during regeneration due to poor electrical contacts within the adsorber as would occur with a granular bed.

Preferably the system should operate at a voltage of around 60V, which minimises safety hazards and sparking, and is also relatively cheap and easy to provide via transformation from standard 240V supplies. The power required to regenerate a monolith is ~150 W at 60V the required current per monolith is 2.4 amp, this then requires a resistance of 25 ohms for a single monolith. If 20 monoliths are connected in series each monolith requires a resistance of 1.2 ohms and if 40 monoliths are connected in series a resistance of 0.6 ohm/monolith would be required. It can be seen that the number of monoliths required to be interconnected is strongly dependent upon the resistivity of the monoliths.

The resistance of the monoliths can be controlled via the temperature at which they are processed and the resistance varies with carbonisation/activation. The preferred activation procedure for the monoliths is in $CO_2$ which requires a temperature of at least 850 C. Lower temperatures can be used if the reactant medium is steam or if a catalyst such as sodium is present in the monolith. In the presence of low levels of sodium and with steam as the activating agent a temperature as low as 700 C is possible. However this leads to inferior pore structure development compared with high temperature carbon dioxide. High temperature $CO_2$ in the absence of catalysts is therefore the preferred route.

It is a feature of the present invention that it enables the operation of a small system without the need for expensive gas compression as it is necessary have a low pressure drop bed combined with a reasonable bed length to avoid problems with early breakthrough and the ability to operate at shorter cycle times which can significantly reduce the amount of adsorbent required.

The invention is described in the accompanying drawings is which:

FIG. 1 CARBON CHARACTERISTICS

Figure 1:
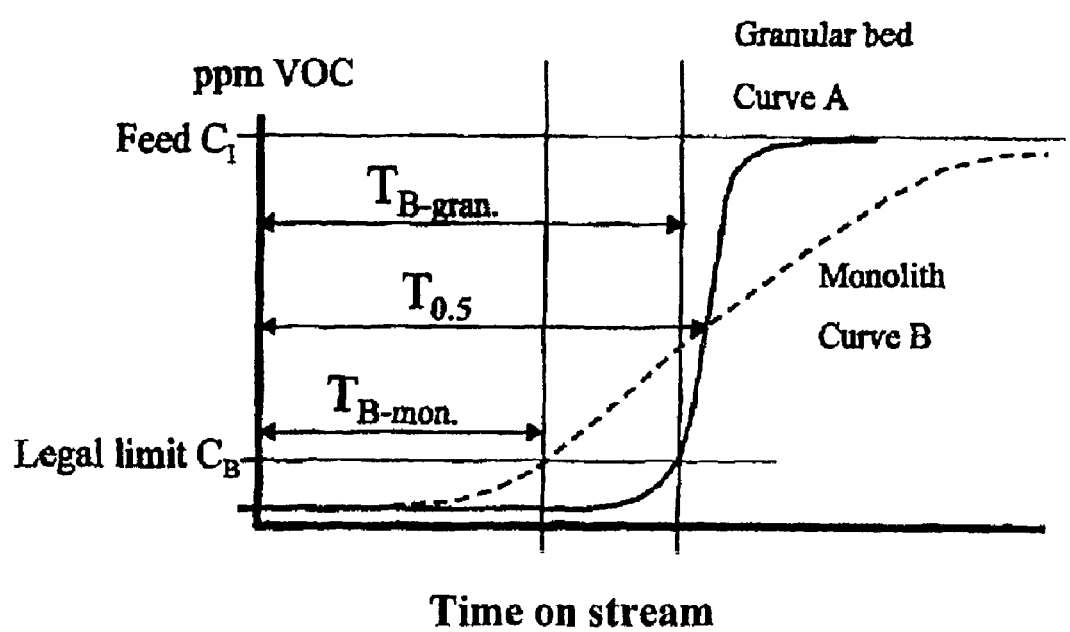
FIG. 1 shows the breakthrough characteristics of carbon adsorbers

Referring to FIG. 1 the adsorber system must be designed to cope with the inherent breakthrough characteristics of the adsorbers and typical breakthrough curves for adsorbers are shown. Curve A, for a typical granular adsorbent, shows a sharp rise in effluent concentration with a time to half inlet concentration of $T_{0.5}$. However the adsorption process must actually be stopped after time $T_{B\text{-}gram}$ when the effluent concentration reaches the legal effluent limit. The dynamic adsorption capacity is then defined as $(C_I - C_B) \times T_{B\text{-}gran}$. In the case, of monolithic adsorbers the breakthrough characteristics are always inferior to fixed beds, as is inevitable for a low pressure drop system, and is as shown in curve B. The time to breakthrough has now decreased to $T_{B\text{-}mon}$ and the dynamic adsorption capacity is now significantly lower even for carbons with equivalent equilibrium capacities. The nature of the breakthrough curve for the monolithic adsorbers is strongly dependent upon the length of the monoliths. We have found that a minimum length of 1m is required to give reasonable breakthrough properties. The use of longer monoliths will increase the dynamic capacity but may reduce the overall cost effectiveness.

Production of Monoliths

Novolak phenolic resin, as originally supplied by BP Chemicals under the trade name Cellobond, in fine powder form was mixed with 3 parts weight hexamethylene tetramine (HEX). The mixed powder was placed in shallow trays and cured by heating at 10 C/hour from room temperature to 100 C, holding for 1 hour at 100 C, further heating to 150 C at 10 C/hour and then holding at 150 C for 2 hours. The cured resin had foamed to produce a solid "biscuit" which was then hammer milled to a grain size of around 500 microns and further milled to produce a fine powder with a mean particle size as defined by the monolith wall thickness and the desired macropore structure. The second milling stage is preferably carried out in a classifying mill to minimise the presence of large particles and can either be a jet mill for particle sizes below ~70 microns or an attritor mill for larger particle sizes The cured resin powder is then converted to a dough for the extrusion forming. All additives should give essentially zero mass yield during the pyrolysis stage of forming process and must contain no metallic or other inorganic impurities. The dough is extruded to form the shaped monoliths which are then cured by heating.

Cell Structure

Figure 7:
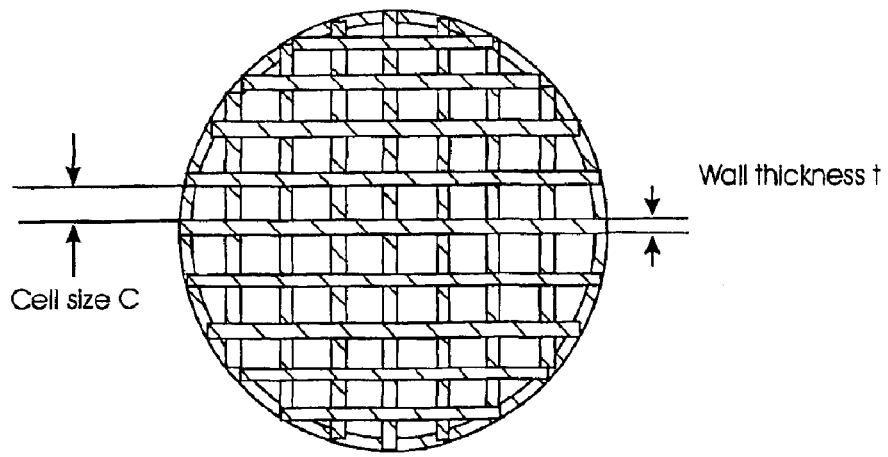
FIG. 7 shows the cell structure

Theoretical studies have shown that, provided the performance of the monolith is not controlled by diffusional limitations within the wall structure of the monolith, then referring to FIG. 7 the optimum structure is a cell size, c, of approximately 150 microns, with a wall thickness of approximately 150 microns, equivalent. With this cell structure the monolith gives equivalent dynamic performance to a granular carbon with a particle size of 300 microns but without the problems of pressure drop and attrition etc associated with the operation of granular beds. A critical aspect of the technology is then the ability to produce pure, electrically conducting, carbon monoliths with these controlled cell structures.

Reactor Design

The series-parallel electrical interconnection of the monoliths allows us to independently adjust both the overall reactor resistance, which controls the voltage that is supplied to the system, and the number of watts per monolith, which controls the rate at which the system heats up during regeneration. This can be seen from the table which is based on a standard monolith resistance of 1 ohm/m, and shows the number of monoliths required for a given voltage and number of watts per monolith. It can be seen that if the voltage of the supply is limited to say 50V and a power input of 90 W/monolith is required to meet the design regeneration cycle, then we need 5 monoliths in series.

TABLE

| Watts/ | VOLTS | | | | | |
| --- | --- | --- | --- | --- | --- | --- |
| Monolith | 10 | 30 | 50 | 70 | 90 | 110 |
| 10 | 3 | 9 | 16 | 22 | 28 | 35 |
| 30 | 2 | 5 | 9 | 13 | 16 | 20 |
| 50 | 1 | 4 | 7 | 10 | 13 | 16 |
| 70 | 1 | 4 | 6 | 8 | 11 | 13 |
| 90 | 1 | 3 | 5 | 7 | 9 | 12 |

After that the reactor design would use banks of 5 series interconnected monoliths in parallel to give the total mass of carbon dictated by the volume of the gas stream to be treated, the VOC (volatile organic compounds) content of the gas stream and the regeneration cycle time. The series electrically interconnected monoliths could then be connected in line to give a single long monolith, which would maximise the gas linear velocity through the monoliths, or in a looped configuration to give parallel flow paths, which minimises linear velocity.

Figure 2:
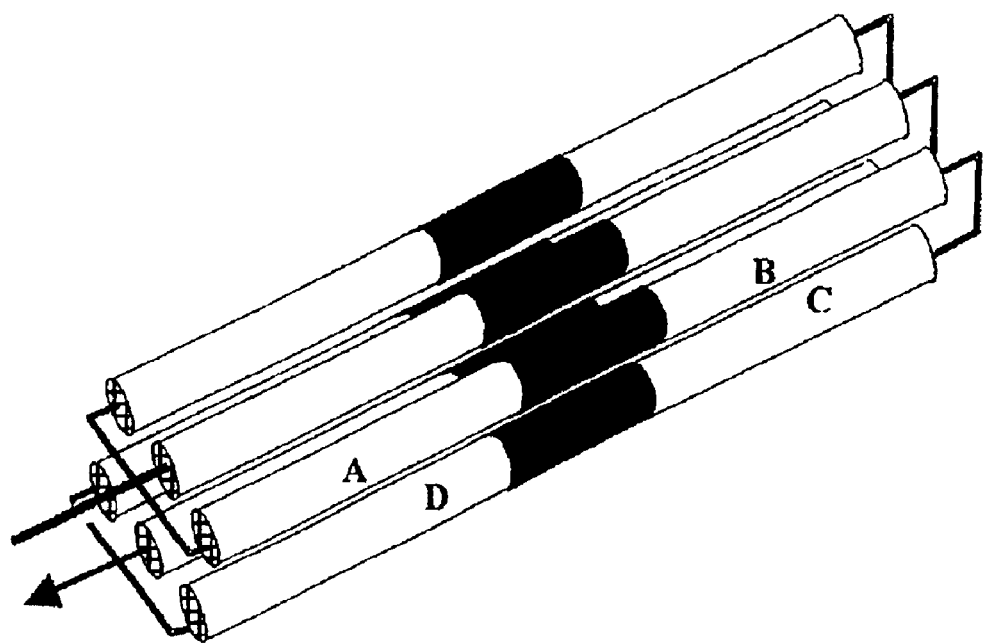
FIG. 2 and FIG. 3 show arrangements of monoliths

The configuration of a reactor is shown schematically in FIG. 2. This shows a configuration with 4 monoliths connected in series (A, B, C and D) and three banks of these connected in parallel.

In this configuration there are 6 parallel gas pathways. The alternative configuration, shown in FIG. 3, has the same resistance as the reactor shown in FIG. 1 as it still has 4 monoliths in series and 3 banks of 4 monoliths in parallel but has a higher linear gas velocity as the feed passes through 3 monoliths in parallel, not 6.

This unique configurational flexibility allows the gas linear velocity to be adjusted independently of the bed electrical characteristics.

Electrical Connections

Figure 4A:
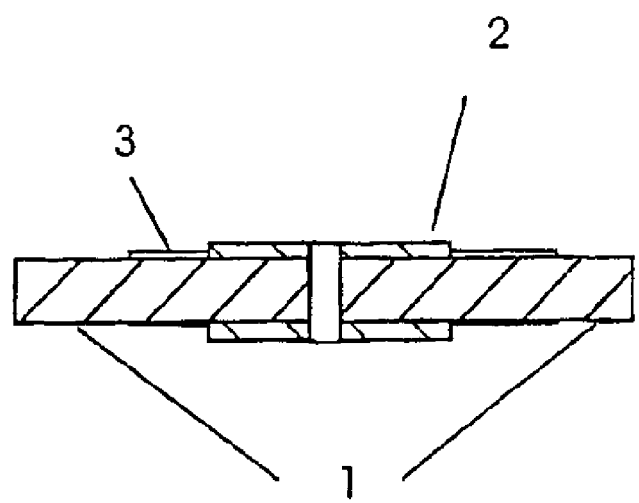
FIG. 4 shows connection of the ends of monoliths
Figure 4B:
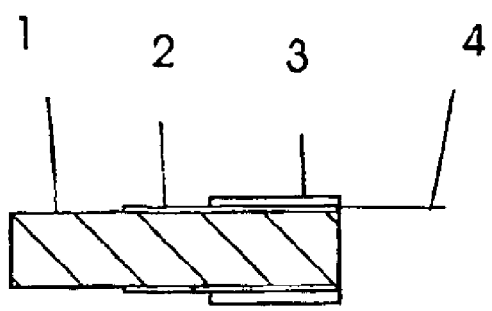

To achieve this design it is necessary to be able to make simple electrical connections at each extreme end of the monoliths (A) and gas tight electrical connections at the joints between monoliths (B). We have now found that these connections can be readily made using a combination of electrically conducting metal mesh sold by Warth International under the trade name of "Mesh Wrap" and "shrink wrap" plastic tubing, for instance "Flame Retardant Heat Shrink RP4800" sold by Raychem, that has been selected to be stable at the regeneration operating temperature of the reactor. The two types of connection, end and joint are shown schemically in FIGS. 4a and 4b where (1) is the monolith, (2) is a shrink wrap plastic, (3) is the metal mesh connector and (4) is the electrical contact (FIG. 4b)

Gas Connections

Figure 5A:
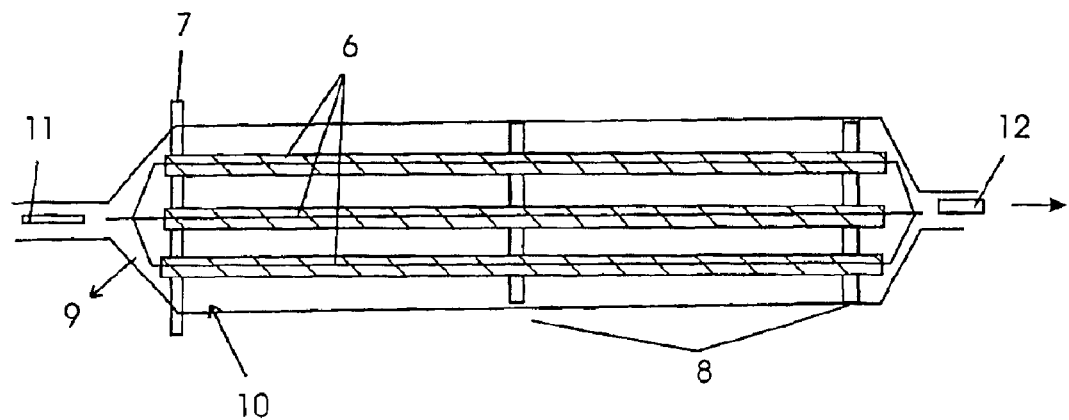
FIG. 5 shows monoliths in place
Figure 5B:
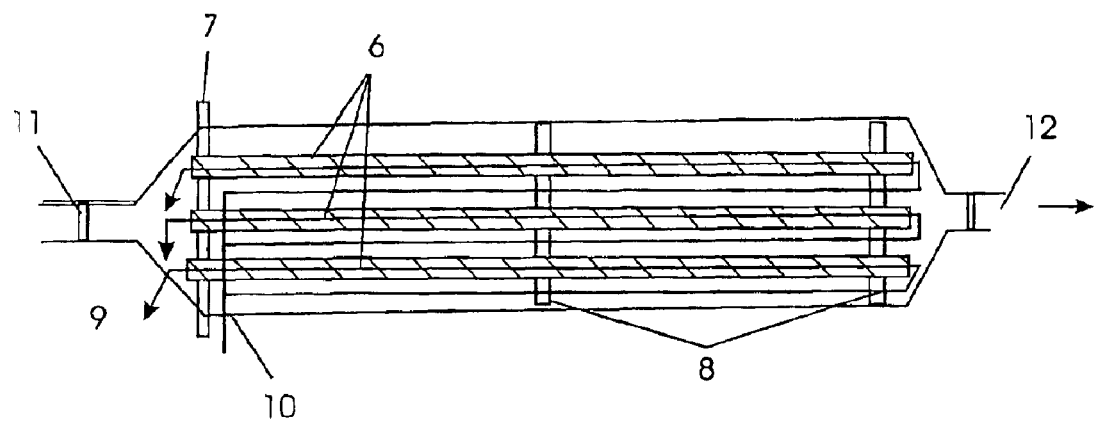

The second requirement for the construction of a viable reactor are leak tight gas interconnections. The general reactor requirement is shown in FIG. 5 for the absorption FIG. 5a and regeneration FIG. 5b cycles. The reactor looks like a conventional floating head heat exchanger. The monoliths (6) are sealed into a plate (7) that is in turn sealed into the reactor body. The head seals are shown in the next diagram. Further along the reactor are two or more location plates (8). These are not sealed to the reactor body or to the monoliths and serve simply to prevent the monoliths moving and touching which could cause an electrical short. Gases can pass these plates either around the monoliths or between the plates and the reactor walls. There is gas regeneration outlet (9), regeneration inlet (10), inlet and outlet values (11) and (12).

Figure 6A:
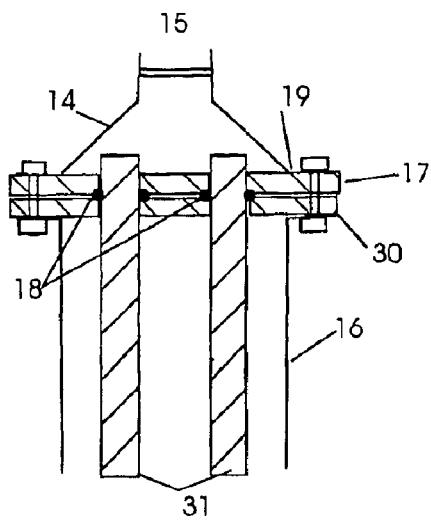
FIG. 6 shows details of the sealing of the monoliths
Figure 6B:
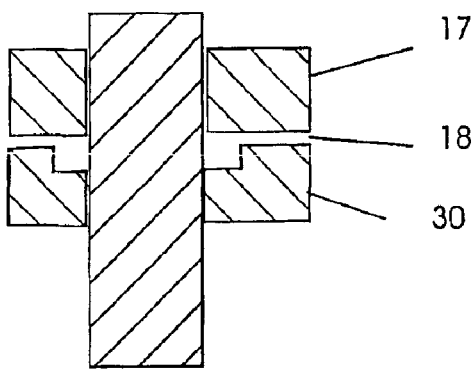

The reactor head assembly can be seen in FIG. 6. This comprises the reactor head (14) with the inlet flap valve (15) and the main reactor body (16). The carbon monoliths are sealed into the reactor by a two part plate assembly (17). The monoliths are held in the two part plate assembly by the O-ring seals (18) where the O-rings are located in a either a chamfered or recessed groove in one of the plates. When the plate assembly is compressed between the head (14) and the body (16) the groove on one plate forces the O-rings against the upper and lower plates and the monoliths providing an effective seal against gas leakage out of the reactor between the plates and past the monoliths into the reactor body. The whole head assembly is also sealed between the head and body of the reactor by the head gaskets (19) and the body gaskets (30). The O-rings are selected from a polymer that is capable of operating at the required regeneration temperature eg Viton, Kalrez (RTM) etc. The head and body gaskets can be beneficially produced from any flexible, compressible gasket material such as rubberised cork or flexible PTFE gasket material. The design of the reactor system minimises the temperature that these gaskets are exposed to as the walls of the containment vessel are partially cooled by the incoming purge gas. This method of assembly also makes it easy to remove and replace monolith elements should any get damaged.

General Reactor Operation

Operation of this reactor assembly follows the following stages by reference to FIG. 5.

1) Adsorption

During adsorption the main inlet (11) and outlet (12) are open with the VOC laden gas passing through the monolith channels from (11) to (12). The regeneration inlet, (10), and outlet, (9), are closed. Typical adsorption gas flows can range from 0.5 L/min per parallel monolith pathway to 25 L per parallel monolith pathway depending on the VOC concentration and the overall process design. In conventional adsorption systems, where the large beds have a high thermal capacity, it is necessary to go through an initial bed cooling stage in clean gas immediately following the regeneration stage and prior to adsorption as the adsorption efficiency of the hot beds is very low. Surprisingly we have found that this intermediate cooling step is no longer necessary in the monolithic reactors. Due to the low thermal capacity of the monolithic beds they can be cooled back sufficiently quickly to the normal adsorption temperatures simply using the incoming feed gases without any adverse effect on the overall adsorption cycle.

2) Regeneration.

During regeneration, the main gas inlet (11) and outlet (12) are closed. The regeneration gas is now brought in through the regeneration gas inlet (10). With the required gas flow established the power is then switched on to the monolith array. Because of the monolithic structure of the adsorbent, this gas can then be passed along the reactor over the outer surface of the carbon monoliths. This heats the regeneration gas to the required regeneration temperature. The gas then enters the monolith internal channels via the monolith outlets and passes counter current to the original adsorption flow, exiting via the regeneration gas outlet (9). Because the monoliths are heated electrically the regeneration gas is no longer required to bring heat into the system to raise the monoliths to the regeneration temperature as is the case in conventional systems. The regeneration flow can therefore be reduced to the minimum required to carry the desorbed VOC's out of the reactor to the collection system. this has the benefit of minimizing heat losses from the system in the regeneration gas although waste heat in the regeneration gas could also be beneficially recovered by a feed-effluent heat exchange system. The temperature in the entire array is controlled by a single thermocouple in the outlet zone of the reactor with power being supplied to all banks simultaneously from a single power supply.

Leakage

Figure 8:
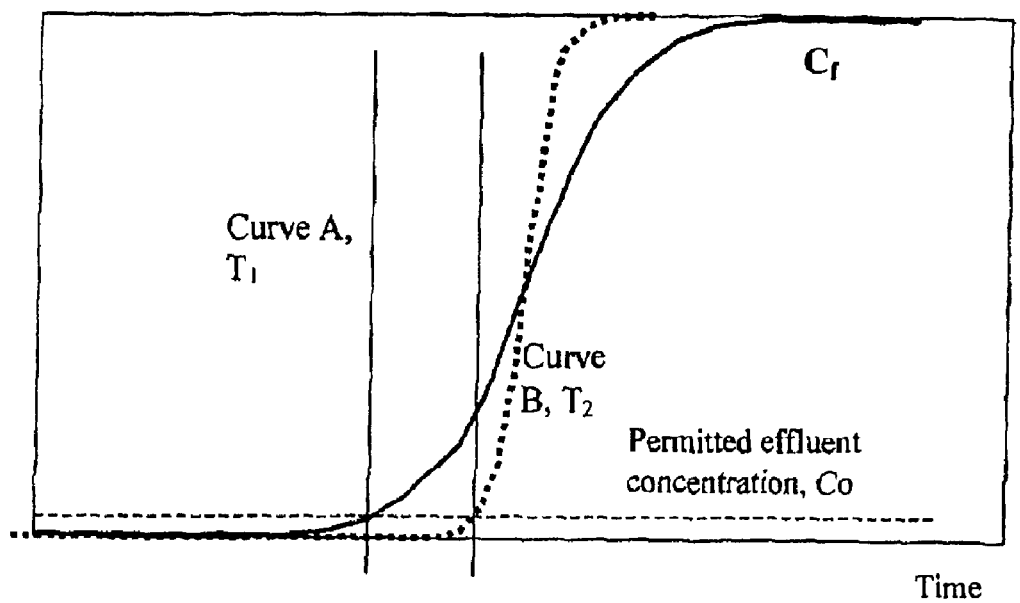
FIG. 8 and FIG. 9 show performance of the monoliths

However we have found that the frequently observed "poor" performance of monolith adsorbers can often be associated with a characteristic of the monolithic reactors we have termed "leakage". This is a low level of VOC's that exits the bed almost immediately the feed is introduced and well before the normal breakthrough (see FIG. 8).

Figure 3:
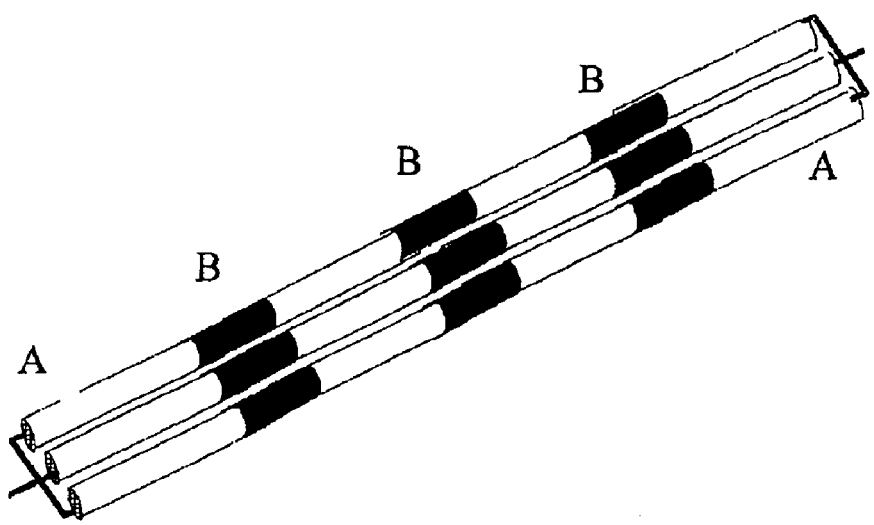
Figure 9:
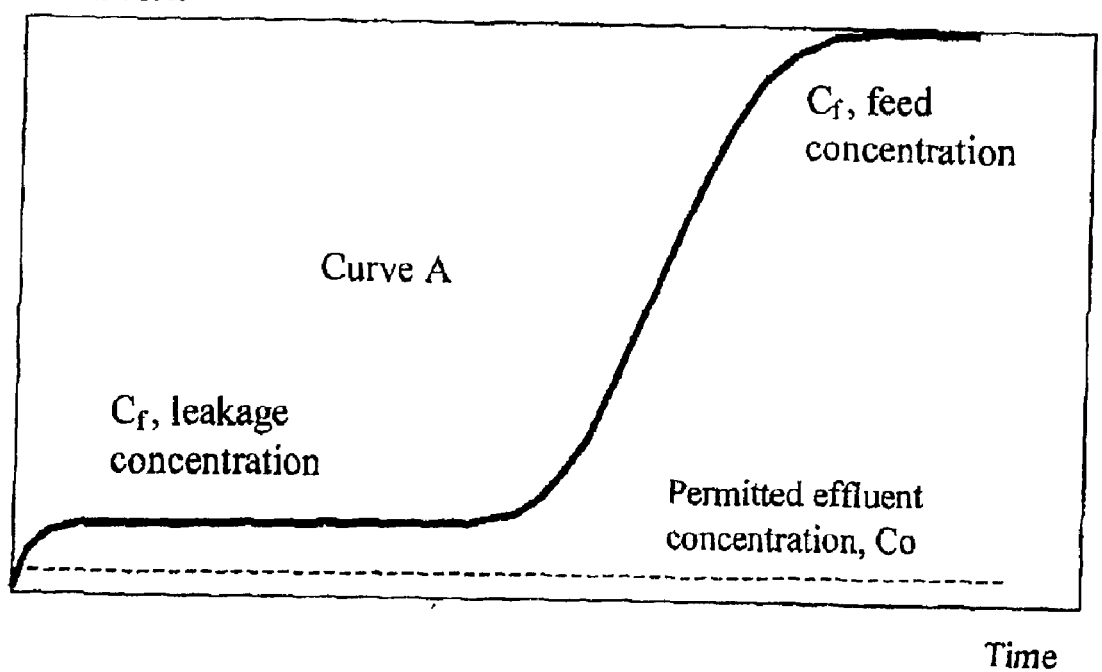

We have found that this "leakage" is a complex function of the feed VOC concentration and the linear velocity in the bed. These characteristics dictate the optimum bed design for systems where such leakage cannot be tolerated. These effects are shown in FIG. 9 where the plateau value of the leakage is shown as a series of contours as a function of feed linear velocity and feed VOC concentration. The net effect is that for minimum leakage the monolithic reactors must be operated at low linear velocity. The maximum usable velocity for zero leakage is then a function of the feed concentration. With the monolith reactors this can be readily achieved by operating with the majority of the monoliths in parallel as shown in FIG. 2 rather than in series as shown in FIG. 3. This "shallow" bed arrangement is readily achieved with the monolith adsorbers whereas in a conventional granular bed such shallow beds can lead to channelling and bed bypassing.

Figure 10:
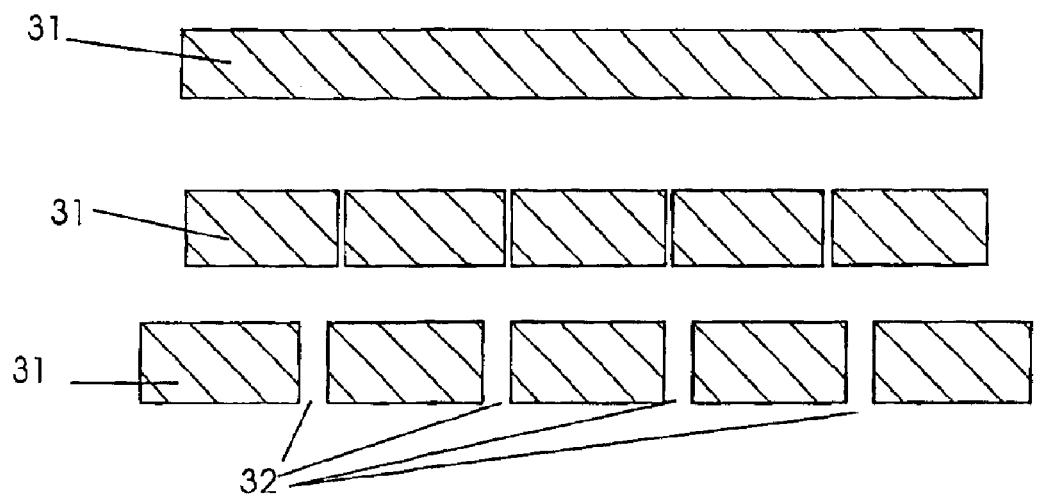
FIG. 10 shows the arrangements of shorter lengths of monoliths

We have also surprisingly shown that the leakage can be further reduced by using multiple shorter lengths of monolith (31) and further reduced if the multiple short lengths of monolith are separated by small spaced (32) but where the overall monolith length in both cases remains unaltered as shown in FIG. 10.

Multi Bed Operations.

FIG. 11

Cycle 1-Bed 1 Adsorbing, Bed 2 Regenerating

Figure 11:
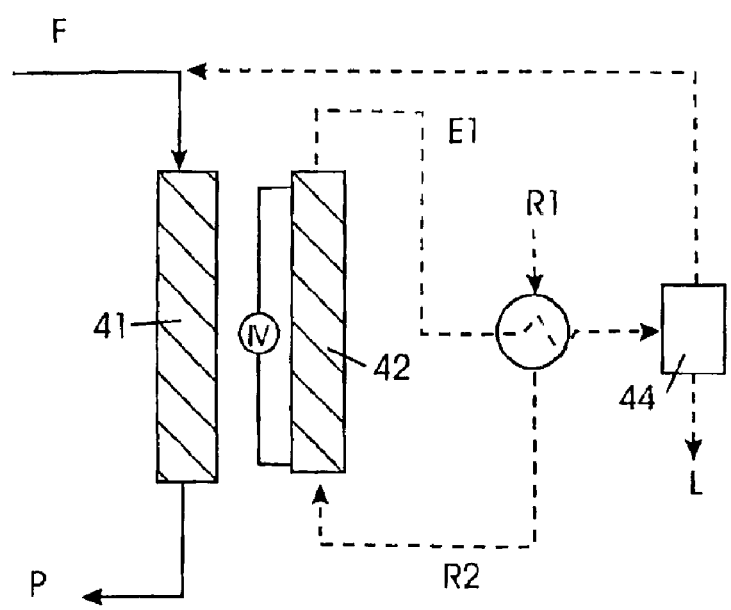
FIG. 11 shows a two bed recovery system

Referring to FIG. 11 two monolith beds (41) and (42) made of monolithic carbon beds are arranged as shown. An electric current can be applied across monolith (42) from (IV). Feed gas (F) comprising air contaminated with VOCs enters the top of monolith bed (41) and exists as VOC free air from the bottom (P). Flow is stopped when the VOC concentration in the effluent air stream reaches the legal limit.

At the same time bed (42) is heated by the current from (IV) and is regenerating. Regenerant gas (R1) passes through the feed-effluent heat exchanger (43) picking up heat from the reactor exit gas (E1) as (R2) and entering the bottom of bed (42) warm. The gas is further heated by the power supplied to the monolith bed (42) and exits the bed at a higher temperature given by the power supplied, the specific heat of the gas and the specific heat of the monoliths.

For typical gas flows and monolith power consumption a typical temperature rise of around 30 C would be expected from the inlet to the outlet of the bed and with the feed effluent heat exchange both the inlet and outlet temperature of the bed will increase steadily with time. The regeneration conditions must then be selected such that the temperature increase across the monolith is kept below 50 C if a reasonable inlet bed inlet temperature is to be achieved. Bed (42) is regenerated and is ready for use.

When the concentration of VOCs in the exit stream (43) of bed (41) reaches the legal limit the flow of the feed gas is switched to the regenerated bed (42) and bed (41) is regenerated by the process described for (42) above.

We have found that the rate of regeneration of the carbon monoliths is very fast and that VOC's are removed at quite low temperatures. Because of the low regenerant gas flow the concentration of the VOC in the exit stream (E1) is high and after cooling in (43) only limited further cooling in (44) is required to recover the organic as a liquid (L).

In some circumstances this could be achieved just with water cooling although some refrigeration may be required depending on the VOC's being recovered and the ambient conditions. The VOC saturated regenerant gas stream (E3) from the chiller (E3) 44 then passes back to the feed stream, (F). Due to the low regenerant gas flows required in this system the additional load on the adsorber due to stream (E3) is minimised. This is only possible with the electrically heated monoliths where large regenerant gas flows to carry the heat to the reactor are not required. The performance of these extended length monolith systems can be further improved by incorporating flow mixing devices in the spaces between the monoliths.

Figure 12:
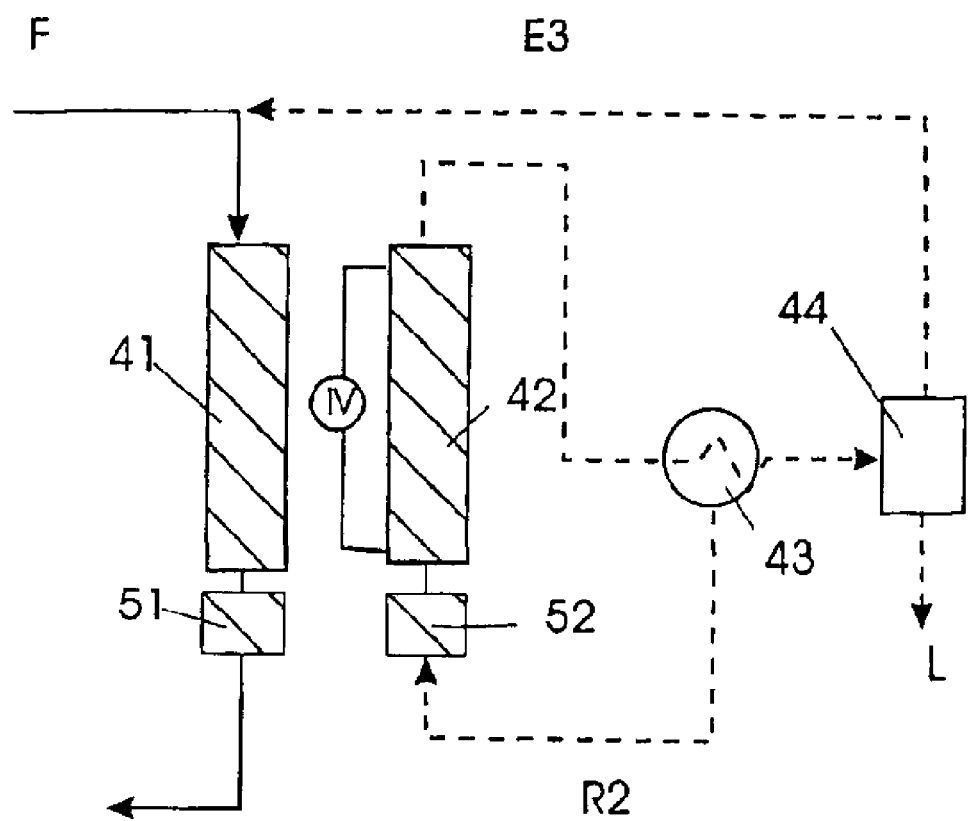
FIG. 12 shows a two bed recovery system with a granular polishing bed

FIG. 12 Use of Granular Bed

Referring to FIG. 12 a significant improvement in performance can be achieved by introducing a small granular carbon beds (51), (52) into the flow pathway of the two bed systems of FIG. 11. This granular bed comprises granular carbon of particle size and has a volume which is 10% of the volume of bed.

This can be used in conjunction with the extended monolith two bed systems or the three bed systems, but will demonstrate maximum benefits when using a two reactor, short monolith system illustrated. The benefit arises from the improved breakthrough characteristics of the granular bed, as shown in FIG. 1 However by only using this to polish the effluent from the monolith bed the volume of granular carbon and the pressure drop introduced is minimised. The problems inherent in heating granular beds are also eliminated as the monolith bed is now used as a preheater for the granular bed. Furthermore by positioning the granular bed at the outlet of the monolith bed and then regenerating in counter current flow mode, the granular bed sees clean regenerant gas which facilitates cleaning at minimum temperature.

Cycle 1 Bed 1 Adsorbing, Bed 2 Regenerating

In the adsorption cycle the feed gas passes to the top of the first monolith bed (41) and from the monolith bed to the first granular bed (51). In this operation (51) is used to polish the effluent from (41) allowing (41) to approach equilibrium uptake. At this stage reactor 2 (42+52) is regenerating. The regenerant gas (RI) passes through the feed effluent heat exchanger (43), preheating the inlet gas to the granular bed (52). As this gas is clean the temperature required to regenerate (52) is minimized. The regenerant gas passes direct to (B2) and then to the heat exchanger (43). Cooled effluent gas passes to the cooling system where liquid is recovered and the VOC saturated effluent passes back to the feed to (R1).

Cycle 2 Bed 2 Adsorbing, Bed 1 Regenerating

In cycle 2 the roles of the beds are simply reversed with (42) now the adsorber and (42) regenerating.

This system is only feasible because it uses the electrically heated monolith beds as preheaters for the granular beds. The granular beds can either be separate beds or can be contained within the head space of the monolith reactors.

Figure 13:
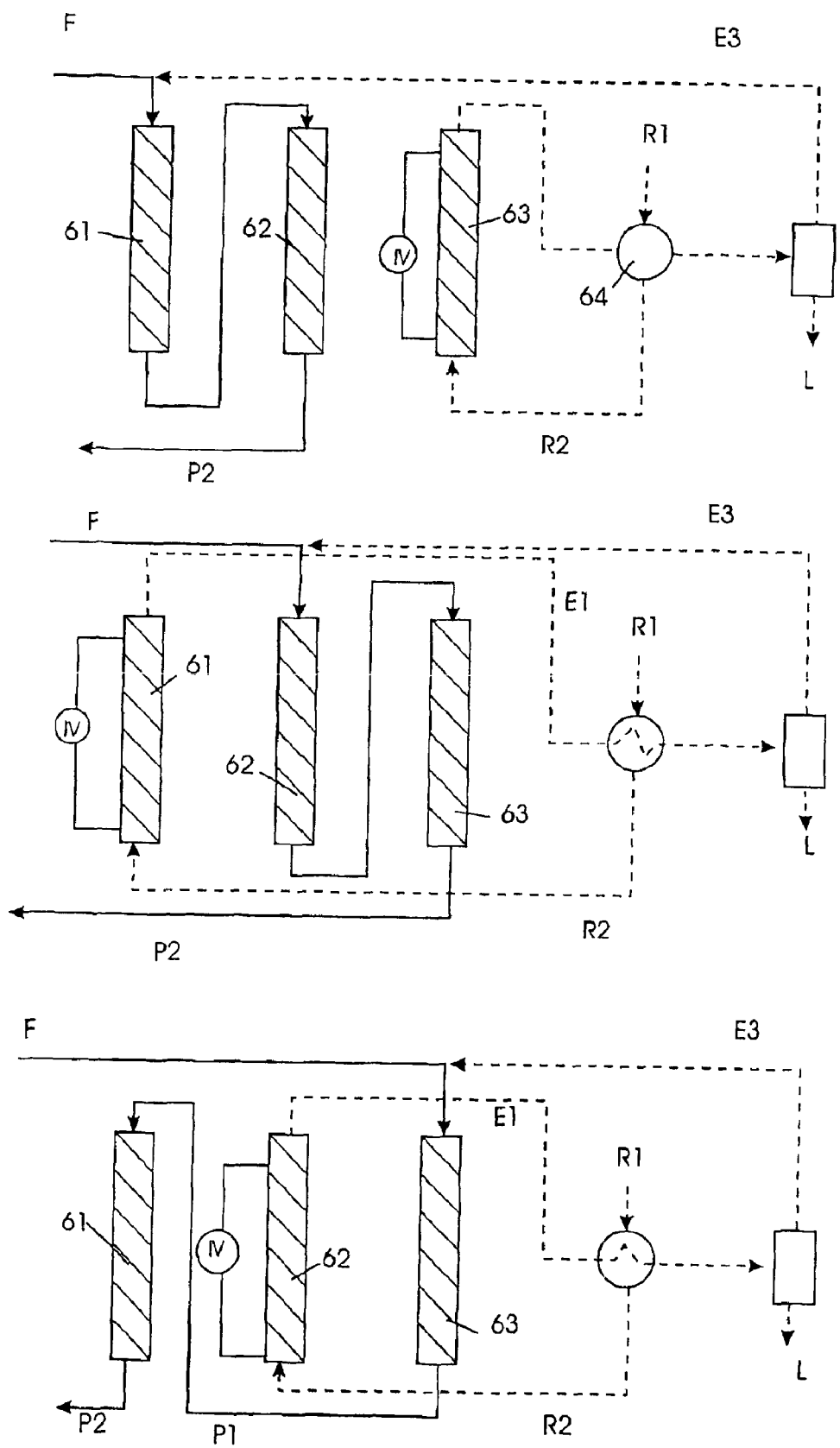
FIG. 13 shows a three bed recovery system

FIG. 13 Three Bed System

Referring to FIG. 13 this illustrates that the requirement for additional length can also be achieved by using a three bed system where two monoliths adsorb and one regenerates. This has the benefit of reducing the number of monoliths required (adsorption efficiency increased), reducing the number of monoliths that have to be regenerated at any point in the cycle and reducing the length of the reactors, but this is compensated for by the increased complexity of the flow and control systems. As in the two bed, long monolith, system the integrated regeneration is only possible because of the low regenerant gas flows and the use of electrical heating.

In the operation of this system there are three operating cycles. The increased monolith length is achieved by operating two out of the three beds in series.

Cycle 1 Beds 1 and 2 Adsorbing, Bed 3 Regenerating

Feed gas (F) enters the top of reactor (61) and then passes from the bottom of reactor (61) to the top of reactor 2 (62). The outlet VOC concentration from (61) in stream (P1) can be allowed to increase significantly beyond the effluent limit in the product gas stream (P2) as this is further reduced in reactor (62). The overall operating time is fixed by the time taken to reach the allowed product gas limit in stream (P2). Whilst (61) and (62) are adsorbing reactor (63) is regenerating. Cold regenerant gas (stream R1) is passed through a feed/effluent heat exchanger (64). This picks up heat from the reactor effluent stream (E1), preheating the inlet gas to (63). The hot regenerant gas stream (R2) enters reactor (63) at the bottom, countercurrent to the original adsorbing gas stream. Heat is supplied electrically to the gas via the current passed through the monoliths. The temperature rise from the inlet to the outlet of the bed can be estimated from the power supplied (IV) and the thermal capacity of the carbon and gas.

When the adsorbed organic material starts to desorb the temperature rise will be reduced by the heat of desorption of the organic. This can be roughly estimated at $2 \times H_{vap}$, where $H_{vap}$ is the heat of vapourisation of the adsorbed organic material.

During regeneration only a low gas flow is required as it does not provide any of the heat to the beds, it only serves to remove the organics to the recovery system and to provide limited heat transfer to the bed inlet. The flow should therefore be minimised to maximise the concentration of the organics in the effluent stream. This effluent stream, after heat exchange to reduce the temperature ($64e2$), is then taken to the VOC recovery unit. Because of the low gas flows and the high VOC concentrations we have found that very limited cooling is required which under some circumstances may only be cooling water. The VOC's are recovered from the cooling system as a liquid (L). The gas stream from the cooler (E#), which is still saturated with VOC'S, is returned to the feed inlet stream (E3) to bed (61). Because the regeneration gas flow is so low this can be added into the much higher feed flow without significantly increasing the load the adsorbers.

Cycle 2 Beds 2 and 3 Adsorbing, Bed 1 Regenerating

In the second cycle the first bed in the adsorption cycle is now the second bed from cycle 1 (62), This bed had a low level of adsorbed organics as adsorption in cycle 1 was stopped when this bed reached the legal breakthrough limit. The final polishing bed now becomes the bed that was regenerated in cycle 1 (63). The bed that was fully saturated in cycle 1 (61) now moves to regeneration.

Cycle 3 Beds 1 and 3 Adsorbing, Bed 2 Regenerating

In the third cycle the first bed in the adsorption cycle (63) is now the second bed from the second adsorption cycle. The polishing bed is the bed regenerated in cycle 2 (61), whilst bed (62) moves to regeneration.

Figure 14:
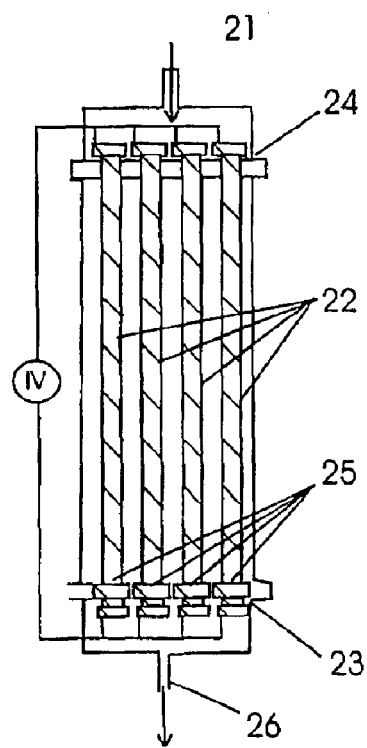
FIG. 14 shows the gas distribution and electrical connections used in the beds and FIG. 15 shows the electrical connections

FIGS. 14 and 15 Gas Distribution and Electrical Connections

The three systems described above can only be utilised when effective electrical connections can be made to the monoliths. This is not possible using simple clamp systems as local high resistance leads to overheating and can destroy the gas seals between the monoliths and the tube plate.

All of the systems described above are based on a tube heat exchanger concept that is shown schematically in FIG. 14. Gas enters the head space in the reactor through inlet (21) and exit through outlet 26). The porous carbon monoliths (22) are held in elastomeric inlet sheet (24) and outlet sheet (23) and the gas entering through (21) is then distributed through the monoliths (22), exiting via the lower tube sheet (23) and outlet (26). It is only necessary to seal one end of the monoliths into the tube sheet (23) by means of seals (25) to prevent the gas by-passing the monoliths. Due to the temperature gradients that are generated along the monoliths during regeneration it is preferred that the exit end of the monoliths is sealed as this is the lower temperature end during counter current flow regeneration. This end can be sealed into the tube sheet using conventional high temperature elastomeric sealants. The electric current (IV) can be applied across all the monoliths (22) as shown.

Figures 15A, 15B:
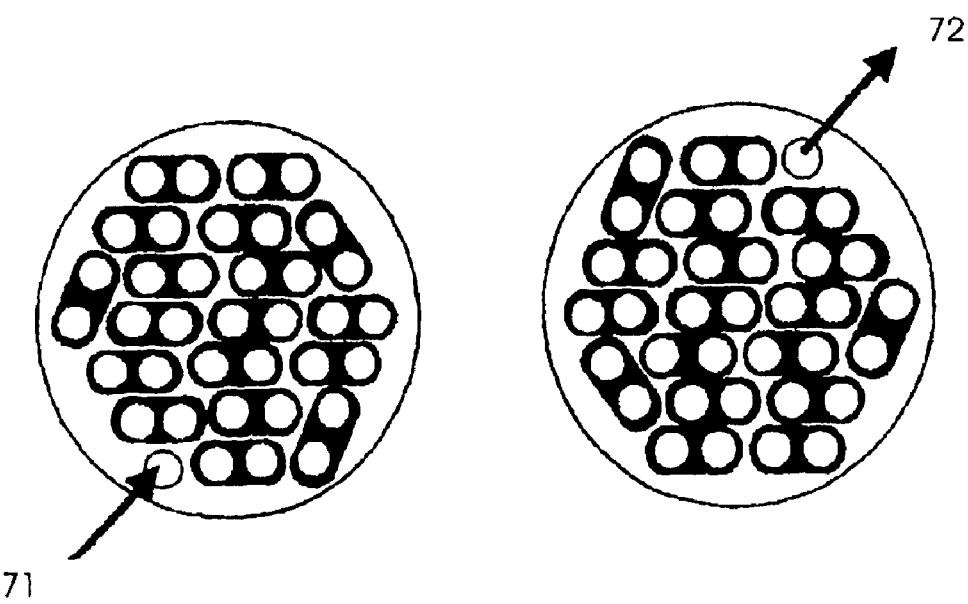

Referring to FIG. 15, this shows a preferred way in which the monoliths are electrically connected for 37 monoliths in series. FIG. 15a shows the top flange with power inlet (71) and FIG. 15b shows the bottom flange with power outlet (72). The monoliths can be interconnected using a "printed circuit" approach where the tube sheets (7) shown in FIG. 5 are made of an electrically resisting materials such as is used in printed circuit boards and the monoliths are interconnected using copper tracks on the surface of the board as shown.

What is claimed is:

1. A method for removing volatile compounds from air, which method comprises passing the air over an adsorber comprising a monolithic porous carbon to adsorb the volatile compounds, and then passing an electric current through the adsorber to heat the adsorber and drive off at least some of the adsorbed compounds wherein the monolithic porous carbon is made by partially curing a phenolic resin to a solid, comminuting the partially cured resin, sintering the comminuted resin so as to produce a form-stable sintered product and carbonising the form-stable sintered product.

2. A method as claimed in claim 1 wherein the porous carbon monolith has a resistivity of between 0.1 and 50 ohms/m.

3. A method as claimed in claim 1 wherein the porous carbon monolith has a cell structure wherein the channel size is between 0.5 and 1 mm and the wall thickness is between 0.5 and 1 mm and having an open area of between 30 and 60%.

4. A method as claimed in claim 1 wherein the porous carbon monolith has a surface area of at least 700 $m^{1/}g$.

5. A method as claimed in claim 1 wherein the adsorber comprises an adsorber bed comprising a plurality of monoliths electrically connected together in series and/or in parallel.

6. A method as claimed in claim 5 wherein a gas flows through the plurality of monoliths.

7. A method as claimed in claim 1 wherein the porous carbon monolith is formed of a plurality of shorter lengths of monolith separated by spaces.

8. A method as claimed in claim 7 wherein the ends of the shorter lengths of monoliths are connected with a metal connector and the ends of the monoliths which are connected are surrounded with a gas impervious plastic which forms a conduit between the ends of the monoliths.

9. A method as claimed in claim 8 wherein the monolith end connection is directly soldered to the metal connector.

10. A method as claimed in claim 8 wherein the monolith end connection is directly soldered to the metal connector and the ends of the carbon monoliths are copper plated.

11. A method as claimed in claim 7 wherein the adsorbed compounds that are driven off from the porous carbon monolith pass through a granular carbon bed.

12. A method as claimed in claim 1 wherein the adsorbed compounds that are driven off from the porous carbon monolith pass through a granular carbon bed.

13. A method as claimed in claim 12 wherein the granular bed comprises one of granular or extruded activated carbon of particle size of 0.1 mm to 2 mm and has a volume of up to 15% of the volume of the porous carbon monolith.

14. A method as claimed in claim 1 wherein the adsorber comprises a plurality of adsorbers and further comprising the steps of, when at least one adsorber has a gas stream containing VOCs passing over it, heating at least one other adsorber by having an electric current passed through it, and when the adsorbed compounds that are driven off from the adsorbing bed reaches a predetermined limit, switching the beds.

15. Apparatus for the regenerable adsorption of VOCs, the apparatus which comprises an adsorber bed which comprises a monolithic porous carbon, wherein the monolithic porous carbon is made by partially curing a phenolic resin to a solid, comminuting the partially cured resin, sintering the comminuted resin so as to produce a form-stable sintered product and carbonising the form-stable sintered product; a gas inlet and a gas outlet for the adsorber bed, whereby gas or vapor can be passed over the adsorber bed, and means for passing an electric current through the adsorber bed.

16. Apparatus as claimed in claim 15 wherein the monolithic porous carbon has a resistivity of between 0.1 and 50 ohms/m.

* * * * *